(12) United States Patent
Newman (10) Patent No.: US 10,608,299 B2
(45) Date of Patent: Mar. 31, 2020

(54) COOLING SYSTEM FOR A BATTERY PACK SYSTEM FOR QUICKLY ADDRESSING THERMAL RUNAWAY

(71) Applicant: NIO USA, Inc., San Jose, CA (US)

(72) Inventor: Austin Newman, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/340,233

(22) Filed: Nov. 1, 2016

(65) Prior Publication Data

US 2018/0048037 A1 Feb. 15, 2018

Related U.S. Application Data

(60) Provisional application No. 62/372,759, filed on Aug. 9, 2016.

(51) Int. Cl.
*H01M 10/63* (2014.01)
*H01M 10/0525* (2010.01)
(Continued)

(52) U.S. Cl.
CPC ......... *H01M 10/63* (2015.04); *H01M 2/1077* (2013.01); *H01M 2/1083* (2013.01);
(Continued)

(58) Field of Classification Search
CPC ........... H01M 10/0525; H01M 10/425; H01M 10/48; H01M 10/613; H01M 10/625;
(Continued)

(56) References Cited

U.S. PATENT DOCUMENTS

2007/0134547 A1 6/2007 Bouffard et al.
2009/0145219 A1* 6/2009 Champion ............ G01F 23/284
73/304 C
(Continued)

FOREIGN PATENT DOCUMENTS

WO WO 2008/074034 6/2008

OTHER PUBLICATIONS

U.S. Appl. No. 15/610,137, filed May 31, 2017, Smith et al.
(Continued)

*Primary Examiner* — Robert S Jones
*Assistant Examiner* — Victoria H Lynch
(74) *Attorney, Agent, or Firm* — Sheridan Ross P.C.

(57) ABSTRACT

A battery pack system includes a battery pack module having a plurality of sealed battery cell containers, each having at least one battery cell configured to store electrical energy and a port. The battery pack system further includes a battery pack management system having a controller and a plurality of sensors operatively connected to the controller. The battery pack system further has a cooling system having a coolant source, a fluid channel connecting the coolant source to the port of at least one of the plurality of sealed battery cell containers, and at least one valve operatively connected to controller. The controller is configured to receive a signal from one of the plurality of sensors indicative of an abnormal condition at one of the sealed battery cell containers and control the at least one valve to introduce coolant fluid into the sealed battery cell container.

14 Claims, 3 Drawing Sheets

(51) Int. Cl.
  *H01M 2/10* (2006.01)
  *H01M 10/42* (2006.01)
  *H01M 10/48* (2006.01)
  *H01M 10/613* (2014.01)
  *H01M 10/625* (2014.01)
  *H01M 10/6561* (2014.01)
  *H01M 10/6567* (2014.01)
  *H01M 10/633* (2014.01)
  *H01M 10/052* (2010.01)

(52) U.S. Cl.
  CPC ..... *H01M 10/052* (2013.01); *H01M 10/0525* (2013.01); *H01M 10/425* (2013.01); *H01M 10/48* (2013.01); *H01M 10/482* (2013.01); *H01M 10/613* (2015.04); *H01M 10/625* (2015.04); *H01M 10/633* (2015.04); *H01M 10/6561* (2015.04); *H01M 10/6567* (2015.04); *H01M 2010/4271* (2013.01); *H01M 2220/20* (2013.01); *Y02E 60/122* (2013.01); *Y02T 10/7011* (2013.01)

(58) Field of Classification Search
  CPC ............. H01M 10/63; H01M 10/6561; H01M 10/6567; H01M 2010/4271; H01M 2220/20; H01M 2/1077
  See application file for complete search history.

(56) References Cited

U.S. PATENT DOCUMENTS

| | | | |
|---|---|---|---|
| 2010/0136391 A1* | 6/2010 | Prilutsky | H01M 10/63 429/62 |
| 2011/0189511 A1* | 8/2011 | Yoon | H01M 10/48 429/50 |
| 2013/0177791 A1* | 7/2013 | Takahashi | H01M 10/482 429/72 |
| 2014/0057144 A1* | 2/2014 | Yang | H01M 10/42 429/62 |
| 2014/0234687 A1 | 8/2014 | Fuhr | |
| 2016/0028059 A1 | 1/2016 | Sweney et al. | |
| 2017/0043194 A1* | 2/2017 | Ling | A62C 3/16 |
| 2017/0200993 A1* | 7/2017 | Song | H01M 10/633 |
| 2018/0034122 A1 | 2/2018 | Newman | |
| 2018/0048039 A1 | 2/2018 | Newman et al. | |

OTHER PUBLICATIONS

Official Action for U.S. Appl. No. 15/340,233, dated Nov. 20, 2018, 7 pages.
Notice of Allowance for U.S. Appl. No. 15/610,137, dated May 13, 2019, 7 pages.

* cited by examiner

COOLING SYSTEM FOR A BATTERY PACK SYSTEM FOR QUICKLY ADDRESSING THERMAL RUNAWAY

PRIORITY CLAIM

This application claims priority under 35 U.S.C. § 119 to U.S. Provisional Application No. 62/372,759, filed on Aug. 9, 2016 which is expressly incorporated by reference herein in its entirety.

FIELD OF INVENTION

The present disclosure relates to a battery pack system, and, more particularly, to a cooling system for a battery pack system for quickly addressing the problem of thermal runaway and related abnormal conditions of battery modules and battery cells.

BACKGROUND

Many electric vehicles rely on battery cells bundled into one or more battery modules to power the vehicle. It is known that the battery cells each build up temperature and pressure inside their battery case during use. As long as the temperature and pressure-build up remains within a tolerable range, the battery cells can continue to operate. If a malfunction or other abnormality occurs, however, the battery cell may overheat and over-pressurize until a safety valve is opened and/or the battery cell ruptures. In a battery module environment, one overheating battery cell may cause thermal runaway which leads to other battery cells overheating and over-pressurizing, further causing damage to multiple cells and ultimately the vehicle.

In order to monitor the status of battery cells and/or a battery module, electric vehicle power systems may include temperature sensors to monitor temperatures associated with the battery modules and/or battery cells. A control module may analyze collected temperature data to determine whether a malfunction or abnormality exists. A response to detection of an abnormal condition such as overheating may include ceasing operation of the battery cell or battery pack and/or providing an indication to an operator that there is a need for service of the battery pack system. However, these responses might not adequately address the urgency of the situation, which may quickly lead to further damage through thermal runaway or other thermal event (e.g., fire) affecting the battery cells.

The present disclosure is directed to overcoming one or more problems of the prior art.

SUMMARY

In one aspect, the present disclosure is directed to a battery pack system. The battery pack system includes a battery pack module including a plurality of sealed battery cell containers. Each battery cell container includes at least one battery cell configured to store electrical energy and a port into the sealed container. The battery pack system further includes a battery pack management system including a controller and a plurality of sensors operatively connected to the controller. Each sensor is respectively associated with at least one of the sealed battery cell containers. The battery pack system further includes a cooling system comprising a coolant source, a fluid channel connecting the coolant source to the port of at least one of the plurality of sealed battery cell containers, and at least one valve operatively connected to controller. The controller is configured to receive a signal from one of the plurality of sensors indicative of an abnormal condition at one of the sealed battery cell containers. The controller is further configured to control the at least one valve to selectively introduce coolant fluid into the one of the sealed battery cell containers.

In another aspect, the present disclosure is directed to a method of treating an abnormal condition in a battery pack module. The battery pack module includes a plurality of sealed battery cell containers, each sealed battery cell container including at least one battery cell configured to store electrical energy. The method includes monitoring a performance parameter of each at least one battery cells and detecting an abnormal condition at one of the sealed battery cell containers based on the monitored performance parameter. The method further includes directing a coolant fluid into the one of the sealed battery cell containers based on the detection of the abnormal condition.

In yet another aspect, the present disclosure is directed an electric vehicle. The electric vehicle includes an electric motor configured to propel the electric vehicle and a battery module including a sealed battery cell container enclosing a plurality of battery cells configured to store electrical energy for use by the motor and including a port. The electric vehicle further includes a battery pack management system comprising a controller and at least one sensor operatively connected to the controller and configured to monitor a parameter of the sealed battery cell container. The electric vehicle also includes a cooling system including a coolant source, a fluid channel connecting the coolant source to the port of the sealed battery cell container, and a valve operatively connected to controller. The controller is configured to receive a signal from the sensor indicative of overheating of a battery cell in the sealed battery cell container. The controller is further configured to generate a signal to control the at least one valve to selectively introduce coolant fluid into the sealed battery cell container to thereby reduce the temperature of the overheating battery cell.

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure relates to a battery pack system which includes a system for immediately addressing the issue of an overheating or over-pressurizing battery cell. For example, the present disclosure describes a cooling system which may be used in conjunction with a battery pack system, such as a battery pack system for an electric vehicle, which is configured to deliver a coolant fluid directly to an effected battery cell upon the detection of an abnormal condition. The battery pack system utilizes sealed battery cell containers to isolate one or more battery cells and provide a space for receiving the coolant fluid when needed. The sealed battery cell containers allow for isolated application of the coolant fluid, thereby stopping or preventing thermal runaway without damaging or hindering the use of other battery cells.

Figure 1:
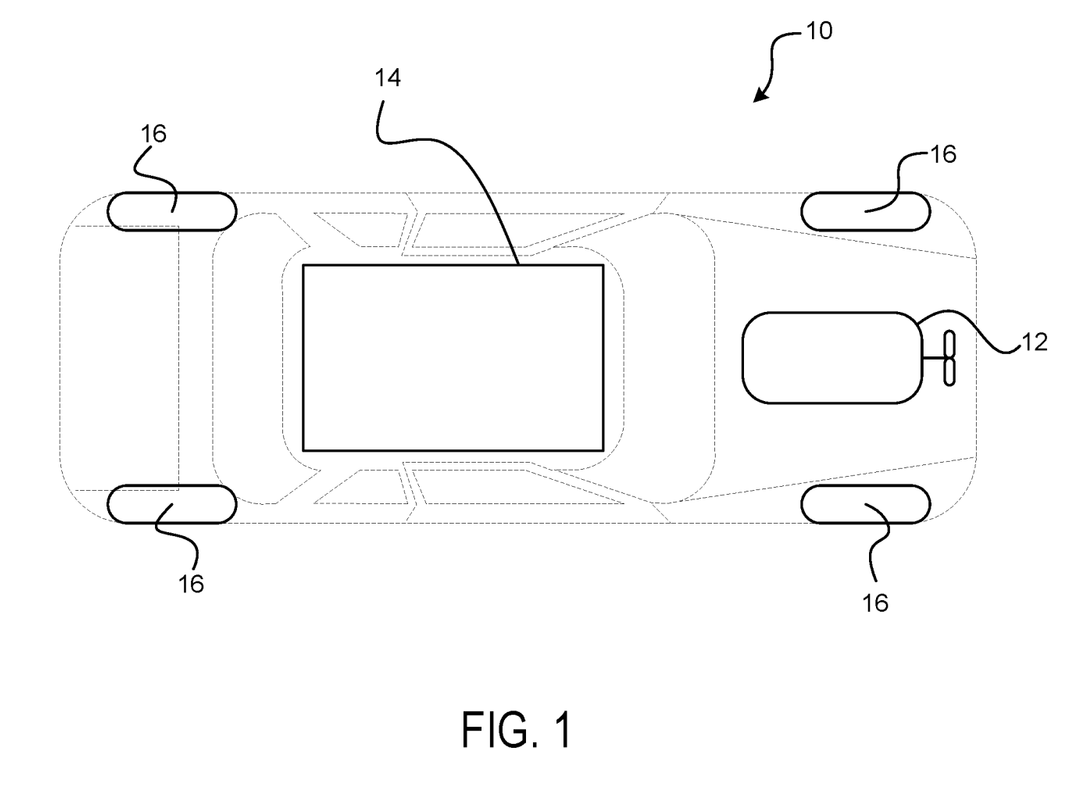
FIG. 1 is a schematic illustration of an electric vehicle including a motor and a battery pack system.

FIG. 1 is a schematic illustration of an electric vehicle 10. While an electric vehicle 10 is shown and described herein, it should be understood that the disclosed embodiments are applicable to other systems that use battery pack systems and battery cells. The electric vehicle 10 includes an electric motor 12 and a battery pack system 14. The electric motor 12 is powered by energy stored by the battery pack system 14 to propel the electric vehicle 10 via a plurality of traction devices 16.

Figure 2:
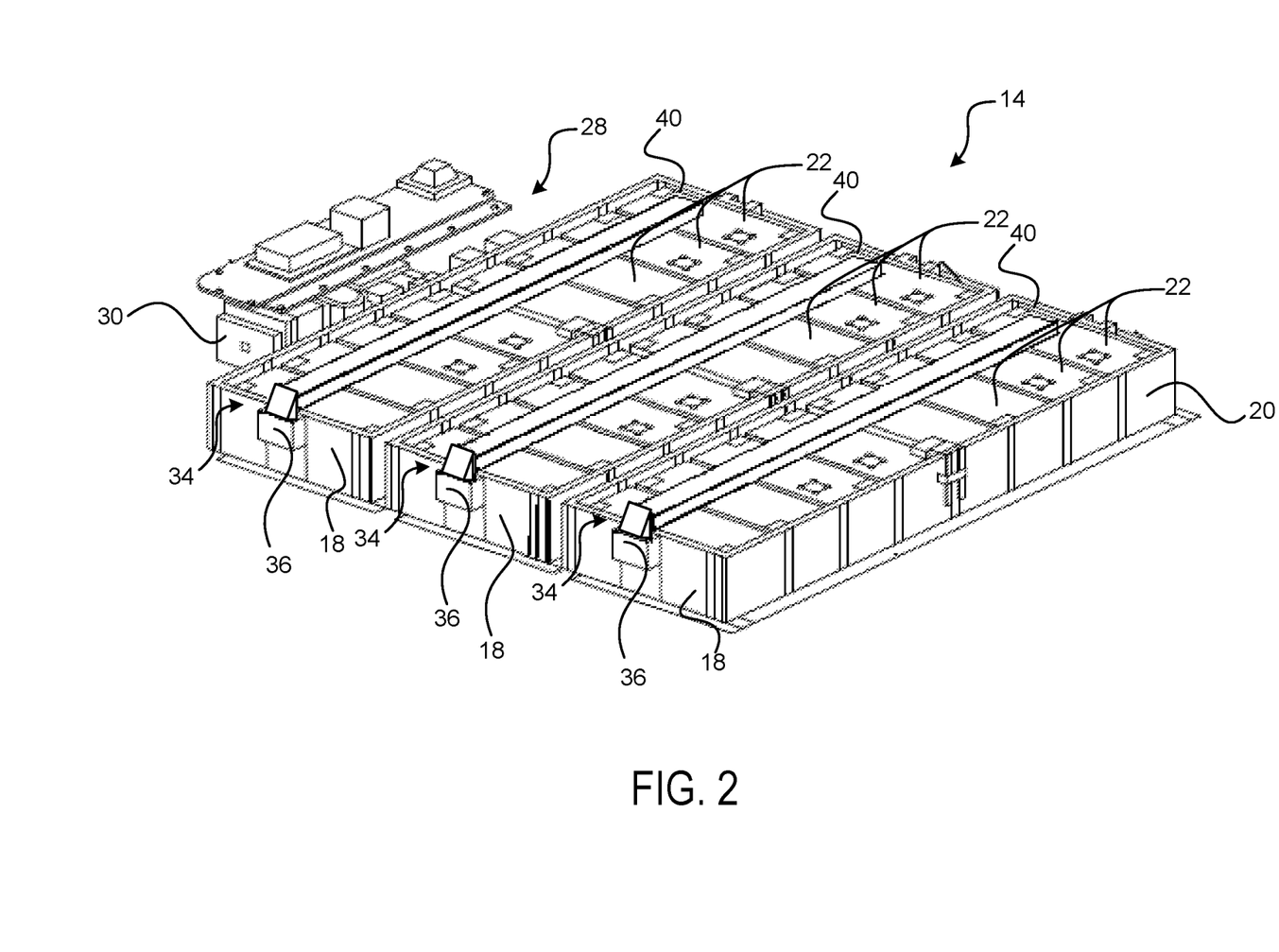
FIG. 2 is a perspective view of an exemplary battery pack system including a cooling system.
Figure 3:
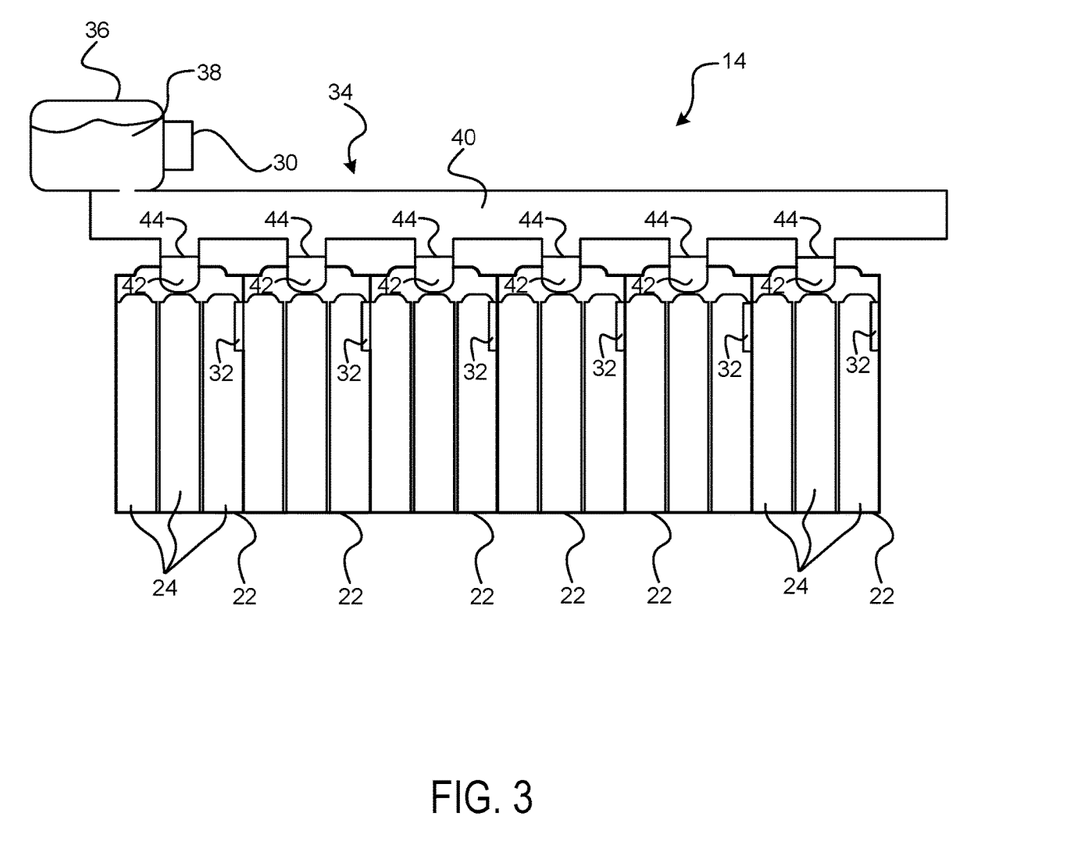
FIG. 3 is a side view of a portion of the battery pack system of FIG. 2.

FIGS. 2-3 further illustrates an exemplary embodiment of the battery pack system 14. The battery pack system 14 is preferably an electrical storage system including various components which allow for the storage and delivery of electrical energy to the electric motor 12 and/or receipt of electrical energy from the electric motor 12 or other vehicle system (e.g., through regenerative braking).

The battery pack system 14 may include at least one battery pack module 18. In the illustrated embodiment, the battery pack system 14 includes three battery pack modules 18, but other amounts are possible. In an exemplary embodiment, each battery pack module 18 includes a module housing 20 which creates an enclosure for the components of each battery pack module 18.

Each battery pack module 18 further includes a plurality of sealed battery cell containers 22 in the respective module housing 20. In one embodiment, each sealed battery cell container 22 is an enclosure which houses at least one battery cell 24 (shown only in FIG. 3). For example, each sealed battery cell container 22 may include a plurality of battery cells 24 electrically connected to each other. The sealed battery cell containers 22 are sealed in that they are entirely enclosed except for designated access points, such as ports, pressure valves, control valves, removable covers, etc., which may be closed themselves and/or at least prevent a fluid interconnection between the battery cell containers 22.

In an exemplary embodiment, each sealed battery cell container 22 includes a least four sidewalls which form an enclosure which surrounds the battery cells 24. The battery cell container 22 may also include a bottom wall which supports the battery cells 24 and a top wall/lid which covers the battery cells 24 and completes an enclosed space in which the battery cells 24 are located.

Each battery cell 22 may be an electrical storage device configured to store electrical energy for use by the electric motor 14. Each battery cell 22 may be, for example, a replaceable battery, rechargeable battery, or the like. Each battery cell 22 may include an associated battery case 26 (shown only in FIG. 3). The battery cells 22 may take any of a number of configurations, including being cylindrical battery cells, rectangular battery cells, etc. In an exemplary embodiment, the battery cells 22 are rechargeable lithium-ion batteries, but are not limited thereto. The battery cells 22 may be connected in series to provide a combined electrical output as the battery cell container 22. Each battery cell container 22 may be connected in series to provide combined electrical output as the battery pack module 18. Each battery pack module 18 may be connected in series to provide combined electrical output as the battery pack system 14. Of course, other configurations and connections are possible. The battery pack system 14 may include additional components, including busbars, wiring, physical connectors, etc. which allow battery pack system 14 to be operational in conjunction with electric vehicle 10.

The battery pack system 14 further includes a battery pack management system 28 configured to monitor and manage the performance of the battery pack modules 18 and the associated components. In an exemplary embodiment, the battery pack management system 28 includes a controller 30. The controller 30 is preferably an electronic control unit including an associated processor, memory, database, etc. The processor is configured to execute software instructions to implement a control strategy through the generation and transmission of command signals and through the receipt of signals (e.g., data signals). The battery pack management system 28 further includes one or more sensors 32 (shown only in FIG. 3), which are configured to monitor an associated battery cell 24, group of battery cells 24, sealed battery cell container 22, etc. The sensors 32 are configured to generate a signal indicative of a monitored parameter and provide the signal to the controller 30.

As the battery pack system 14 operates and provides electrical power output (and receives electrical power input), a temperature and internal pressure of each battery cell 24 changes. The temperature changes rise and fall and effect the temperature of nearby battery cells 24. Collectively, groups of battery cells 24 (e.g., the battery cells 24 in a sealed battery cell container 22) may have an average or effective temperature. Similarly, the pressure changes within the plurality of battery cells 18 produce forces that act on each other to provide combined forces at various locations around the battery pack module 18.

The sensors 32 are configured to monitor a performance parameter associated with one or more of a battery cell 24, a plurality of battery cells 24, a sealed battery cell container 22, a battery pack module 18, or the battery pack system 14 as a whole. In an exemplary embodiment, each battery cell container 22 includes a designated sensor 32 associated therewith. Each sensor 32 is thus configured to monitor a performance parameter associated with a respective battery cell container 22 (and thus associated with the battery cells 24 contained therein).

In an another embodiment, the sensors 32 include sub-group of sensors associated with each sealed battery cell container 22. Each sub-group of sensors 32 includes a sensor 32 respectively associated with each one of the plurality of battery cells 24 in the sealed battery cell container 22. In this way each battery cell 24 is individually monitored. Other ratios and groupings of battery cell containers 22, battery cells 24, and sensors 32 are contemplated and within the scope of the present disclosure.

Each sensor 32 is configured to detect and/or measure a target parameter and generate a signal indicative of the parameter. For example, each sensor 32 may be a temperature sensor configured to measure a temperature associated with a battery cell 24 or group of battery cells 24. In another embodiment, each sensor 32 may be a pressure sensor (e.g., strain gauge) configured to measure a pressure associated with a battery cell 24, such as a pressure exerted on an adjacent battery case 26, a wall of the module housing 20, or another component (e.g., a separator). In some instances, each sensor 32 may be an array of sensors (e.g., a temperature sensor and a pressure sensor, more than one of a temperature sensor and/or pressure sensor). In other embodiments, the sensor 32 may be or include another type of sensor (e.g., a voltage sensor, current sensor, smoke detector, gas presence detector, etc.).

Consistent with disclosed embodiments, each sensor 32 is configured to generate a signal indicative of an abnormal condition. The abnormal condition may be associated with an individual battery cell 24, a group of battery cells 24, a sealed battery cell container 22, and/or a battery pack module 18. The abnormal condition may be overheating of a battery cell 24, such as that caused by a malfunction of the battery cell 24. Such overheating may be detected by sensor 32 in that sensor 32 may be a temperature sensor which detects a temperature of an individual battery cell 24 or battery cell container 22 which exceeds a threshold. In another example, the sensor 32 may be a pressure sensor which detects an over-pressurizing of a battery cell 24 or grouping of battery cells 24 due to the overheating.

The abnormal condition overheating herein refers to a condition in which a detected temperature is indicative of a malfunction of the battery cell 24. Such overheating may cause thermal runaway, a condition in which the increased temperature of one battery cell 24 causes the increase in temperature of an adjacent battery cell 24 and which quickly translates across a group of battery cells 24. In the disclosed embodiment, thermal runaway may occur between sealed battery cell containers 22, and even between battery pack modules 18, affecting all battery cells 24 of the battery pack system 14. This condition may lead to battery pack damage, vehicle damage, or worse.

In order to address the problems associated with malfunctioning battery cells 24, overheating, and/or thermal runaway, the battery pack system 14 further includes a cooling system 34. The cooling system 34 preferably includes a coolant source 36 which contains a coolant fluid 38. The cooling system 34 further includes a fluid channel 40 which fluidly connects the coolant source 36 to at least one of the sealed battery cell containers 22. The sealed battery cell containers 22 preferably each include a port 42 which provides access into the respective sealed battery cell container 22. The fluid channel 40 preferably fluidly connects the coolant source 36 to the interior of the battery cell container 22 via the port 42. In some embodiments, the fluid channel 40 includes a network of channels which connect the coolant source 36 to a plurality of sealed battery cell containers 22.

In the illustrated embodiment, each battery pack module 18 includes a separate coolant source 36 and fluid channel 40 which connects the coolant source 36 to each battery cell container 22. In other embodiments, the battery pack system 14 may include a coolant source 36 associated with more than one battery pack module 18 and a network of fluid channels 40 connecting the coolant source 36 to the sealed battery cell containers 22 of the more than one battery pack module 18. In other embodiments, each battery cell container 22 includes a separate coolant source 36.

In an exemplary embodiment, the cooling system 34 further includes at least one valve 44 operatively connected to the controller 30. The at least one valve 44 preferably includes a plurality of valves 44, each associated with a respective sealed battery container 22. For example, each port 42 may include an associated valve 44 at the port 42. In other embodiments, a single switching valve 44 may be used to fluidly connect the coolant source 36 to a selected battery cell container 22.

The valve or valves 44 are operatively connected to the controller 30 such that the controller 30 is configured to control the valve 44. For instance, the controller 30 is preferably configured to control at least one valve 44 to selectively introduce coolant fluid 38 into a selected sealed battery cell container 22.

The coolant fluid 38 is preferably a fluid (liquid or gas) which rapidly cools an overheating battery cell 24. The coolant fluid 38 may also advantageously be configured to inhibit and/or put out fire that may be caused by an overheating battery cell 24. In an exemplary embodiment, the coolant fluid is a dielectric fireproof liquid or gas, such as C6F12O Novec 1230, Liquid $CO_2$, MIDEL 7131, or argon. Other coolant fluids 38 are contemplated and within the scope of the present disclosure.

The cooling system 34 is thus configured to operate in conjunction with the battery pack system 14 and battery pack management system 28 in order to selectively direct coolant fluid 38 to a desired location within the battery pack system 14. In this way, when an abnormal condition associated with a battery cell container 22 is detected, the controller 30 is configured to cause the cooling system 34 to deliver coolant fluid 38 to the battery cell container 22, thereby enveloping the malfunctioning/overheating battery cell 24 in the coolant fluid 38 and reducing the associated temperature. In this way, continued overheating and the possibility of thermal runaway may be prevented.

An exemplary method for treating an abnormal condition in the disclosed battery pack system 14 includes using the one or more sensors 32 to monitor a performance parameter associated with a battery cell 24. For example, a sensor 32 may measure a temperature associated with a single battery cell 24 or a group of battery cells 24 in a sealed battery cell container 22. The controller 30 monitors the performance parameter based on, for example, signals received from the sensor or sensors 32.

The controller 30 analyzes the monitored parameters and detects that an abnormal condition is present. For example, the controller 30 may detect an abnormal condition at a particular sealed battery cell container 22. The abnormal condition may be, for example, overheating of a battery cell 24 in the particular sealed battery cell container 22. Other similar abnormal conditions may be possible (e.g., over-pressurizing, high voltage or current detection, or other conditions indicative of overheating or that overheating is likely to occur).

Based on the detection of the abnormal condition, the controller 30 may then direct coolant fluid 38 into the relevant battery cell container 22. For example, the controller 30 may control a valve 44 to cause the coolant fluid 38 to flow from the associated coolant source 36 to the battery cell container 22. The coolant fluid 38 flows into the battery cell container 22, reducing the temperature of the malfunctioning battery cell 24 and/or inhibiting the increase of the temperature, thereby helping to prevent thermal runaway and the potential for further damage and/or injury.

The battery cell containers 22, being sealed, isolate the coolant fluid in location where it is needed, helping to leave the battery cells 24 in other battery cell container 22, as well as other components of the battery pack system 14, unaffected. In this way, the method may further include replacing only the sealed battery container 22 which included the malfunctioning battery cell 24. In this way, operation of the electric vehicle 10 may be relatively unaffected and a minimum number of parts may be effected by a malfunction/abnormal condition. Thus, the disclosed battery pack system 14 including cooling system 34 provides a mechanism which quickly reacts to a malfunctioning battery cells and provides a remedy to limit the damage.

It should be understood that the disclosed configuration is exemplary and that other configurations are possible. For example, the disclosed systems may be implemented as a fail-safe or emergency system which helps to prevent the spread of heat from a battery pack module 18 to the rest of the electric vehicle 10. For instance, the module housing 20 itself may be considered a sealed battery cell container with an associated cooling system 34 which directs coolant fluid 38 into the module housing upon the detection of overheating, thermal runway, or other thermal event. In other words, the disclosed embodiments are not limited to the configuration which includes separate sealed housings for separate battery cells. Similarly, in some configurations, each battery cell container may house only a single battery cell.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A battery pack system, comprising:
   a battery pack module comprising a plurality of sealed battery cell containers, wherein each sealed battery cell container of the plurality of sealed battery cell containers comprises,
      a plurality of sidewalls surrounding a battery cell receiving space;
      a bottom wall connected to a first end of the plurality of sidewalls,
      a top lid connected to an opposite second end of the plurality of sidewalls, wherein the plurality of sidewalls, the bottom wall, and the top lid form an enclosure having an interior including the battery cell receiving space;
      a battery cell disposed completely within the interior of the enclosure, wherein the battery cell is supported by the bottom wall, and wherein the battery cell is configured to store electrical energy;
      a port disposed in the top lid providing access into the interior of the enclosure,
      a valve operatively connected to the port, wherein the valve is arranged at the port adjacent to the top lid; and
      a sensor disposed in the enclosure and configured to monitor a performance parameter of the battery cell;
   a battery pack management system comprising a controller operatively connected to the sensor and the valve of each sealed battery cell container; and
   a cooling system comprising a coolant source, a fluid channel connecting the coolant source to each valve of the plurality of sealed battery cell containers, wherein the fluid channel is a single channel that interconnects with, and spans across, each sealed battery cell container along a single side of the battery pack module,
   wherein the controller:
      receives a signal from the sensor of a particular sealed battery cell container of the plurality of sealed battery cell containers, the signal indicative of an abnormal condition of the battery cell of the particular sealed battery cell container; and
      controls the valve of the particular sealed battery cell container to selectively introduce coolant fluid from the fluid channel into the particular sealed battery cell container via the port of the particular sealed battery cell container, wherein the coolant fluid is a liquid that envelopes the battery cell disposed within the particular sealed battery cell container, and wherein the liquid is isolated in the particular sealed battery cell container enveloping the battery cell disposed therein.

2. The battery pack system of claim 1, wherein the abnormal condition is overheating of the battery cell of the particular sealed battery cell container.

3. The battery pack system of claim 2, wherein the sensor is a temperature sensors.

4. The battery pack system claim 2, wherein the sensor is a pressure sensor.

5. The battery pack system of claim 1, wherein the single channel is only disposed on a top side of the battery pack module adjacent to the top lid of each sealed battery cell container.

6. The battery pack system of claim 1, wherein the particular sealed battery cell container is separable and replaceable independent of other sealed battery cell containers of the plurality of sealed battery cell containers.

7. The battery pack system of claim 1, wherein each sealed battery cell container entirely encloses a plurality of battery cells.

8. The battery pack system of claim 7, wherein the plurality of battery cells are cylindrical cells.

9. The battery pack system of claim 7, wherein the sensor is configured to monitor a performance parameter of the plurality of battery cells.

10. The battery pack system of claim 1, wherein the liquid is a dielectric fireproof liquid.

11. An electric vehicle comprising:
    an electric motor configured to propel the electric vehicle;
    a battery module comprising a plurality of sealed battery cell containers, wherein each sealed battery cell container of the plurality of battery cell containers comprises:
       a plurality of sidewalls surrounding a battery cell receiving space;
       a bottom wall connected to a first end of the plurality of sidewalls;
       a top lid connected to an opposite second end of the plurality of sidewalls, wherein the plurality of sidewalls, the bottom walls, and the top lid form an enclosure having a interior including the battery cell receiving space;
       a battery cell disposed completely within the interior of the enclosure, wherein the battery cell is supported by the bottom wall, and wherein the battery cell is configured to store electrical energy for use by the electric motor;
       a port disposed in the top lid providing access into the interior of the enclosure;
       a valve operatively connected to the port, wherein the valve is arranged at the port adjacent to the top lid; and
       a sensor disposed in the enclosure and configured to monitor a performance parameter of the battery cell,
    a battery pack management system comprising a controller operatively connected to the sensor and the valve of each sealed battery cell container; and
    a cooling system comprising a coolant source, wherein a fluid channel connects the coolant source to the valve of the sealed battery cell container,
    wherein the controller is configured to:

receive a signal from the sensor of a particular sealed battery cell container of the plurality of sealed battery cell containers, the signal indicative of overheating of the battery cell of the particular sealed battery cell container; and generate a signal to control the valve of the particular sealed battery cell container to selectively introduce coolant fluid from the fluid channel into the particular sealed battery cell container, wherein the coolant fluid is a liquid that envelopes the overheating battery cell inside the particular sealed battery cell container to thereby reduce the temperature of the overheating battery cell, and wherein the liquid is isolated in the particular sealed battery cell container enveloping the battery cell disposed therein.

12. The electric vehicle of claim 11, wherein the fluid channel is a single channel that interconnects with each sealed battery cell container and spans across a length of the battery module.

13. The electric vehicle of claim 11, wherein the sensor is selected from the group consisting of temperature sensors, pressure sensors, voltage sensors, current sensors, smoke detectors, and gas presence detectors.

14. The electric vehicle of claim 11, wherein the liquid is a dielectric fireproof liquid.

* * * * *

UNITED STATES PATENT AND TRADEMARK OFFICE
CERTIFICATE OF CORRECTION

PATENT NO.         : 10,608,299 B2
APPLICATION NO.    : 15/340233
DATED              : March 31, 2020
INVENTOR(S)        : Austin Newman

Page 1 of 1

It is certified that error appears in the above-identified patent and that said Letters Patent is hereby corrected as shown below:

In the Claims

Claim 1, Column 7, Line 29, delete the "," after "comprises" and insert a --:-- therein.
Claim 1, Column 7, Line 33, delete the "," after "sidewalls" and insert a --;-- therein.
Claim 1, Column 7, Line 44, delete the "," after "enclosure" and insert a --;-- therein.
Claim 3, Column 8, Line 12, delete "temperature sensors" and insert --temperature sensor-- therein.
Claim 4, Column 8, Line 13, delete "system claim 2" insert --system of claim 2-- therein.
Claim 11, Column 8, Line 46, delete "the bottom walls" and insert --the bottom wall-- therein.
Claim 11, Column 8, Line 47, delete "having a interior" and insert --having an interior-- therein.
Claim 11, Column 8, Line 60, delete the "," after "battery cell" and insert a --;-- therein.

Signed and Sealed this
Nineteenth Day of May, 2020

Andrei Iancu
*Director of the United States Patent and Trademark Office*